United States Patent [19]

Knoll

[11] 4,320,310
[45] Mar. 16, 1982

[54] AUTOMATIC CONTROL SYSTEM INCLUDING A PROGRAMMABLE MEMORY WITH MANUALLY INSERTABLE JUMPERS

[75] Inventor: Alois Knoll, Schönaich, Fed. Rep. of Germany

[73] Assignee: Firma Centra-Bürkle GmbH & Co., Schönaich, Fed. Rep. of Germany

[21] Appl. No.: 135,767

[22] Filed: Apr. 10, 1980

[30] Foreign Application Priority Data

Apr. 11, 1979 [DE] Fed. Rep. of Germany ....... 2914611

[51] Int. Cl.³ .............................................. H01H 7/00
[52] U.S. Cl. ..................................... 307/141; 307/115
[58] Field of Search ..................... 307/115, 141, 141.4, 307/141.8; 339/18 C, 18 P; 365/164

[56] References Cited

U.S. PATENT DOCUMENTS 4,164,665  8/1979  Berger ................................ 307/141

FOREIGN PATENT DOCUMENTS 7824156  8/1978  Fed. Rep. of Germany .

*Primary Examiner*—Michael L. Gellner
*Assistant Examiner*—James L. Dwyer
*Attorney, Agent, or Firm*—Karl F. Ross

[57] ABSTRACT

A programmable memory for the automatic control of a heating or cooling plant over a 24-hour, 7-day or longer cycle comprises a frame with a multiplicity of mutually parallel printed-circuit strips whose major surfaces carry two sets of conductors arrayed in an orthogonal matrix, the strips being overlain by a cover plate with slits for the insertion of jumpers bridging selected conductors at their points of intersection. The conductors of one set are sequentially energized while those of the other set are rapidly scanned to detect an output signal representing a selected time in the program cycle at which a command for a change in thermostat setting is to be emitted. The cycle is established or modified by a program plate superimposable upon the cover plate to block some of its slits and/or to actuate one or more switches correlating the several matrix outputs with respective clock readings different for the various cycles. A single program plate may be reversibly positionable on the cover plate to allow selection of two different cycles; a third cycle may be provided by the exposed cover plate itself.

6 Claims, 13 Drawing Figures

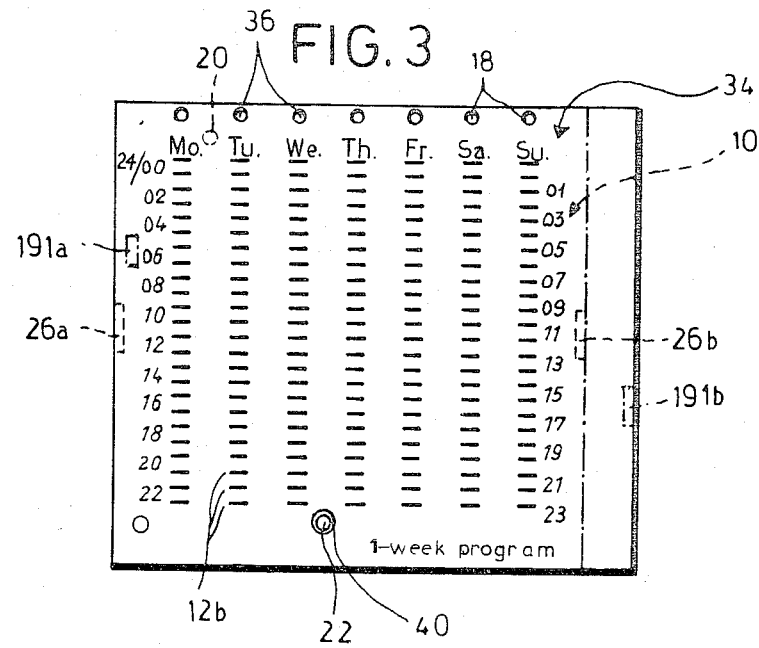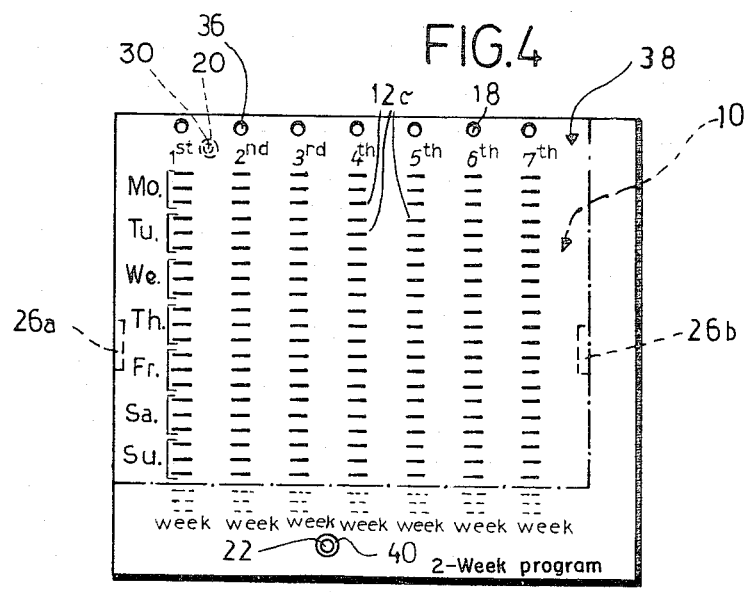

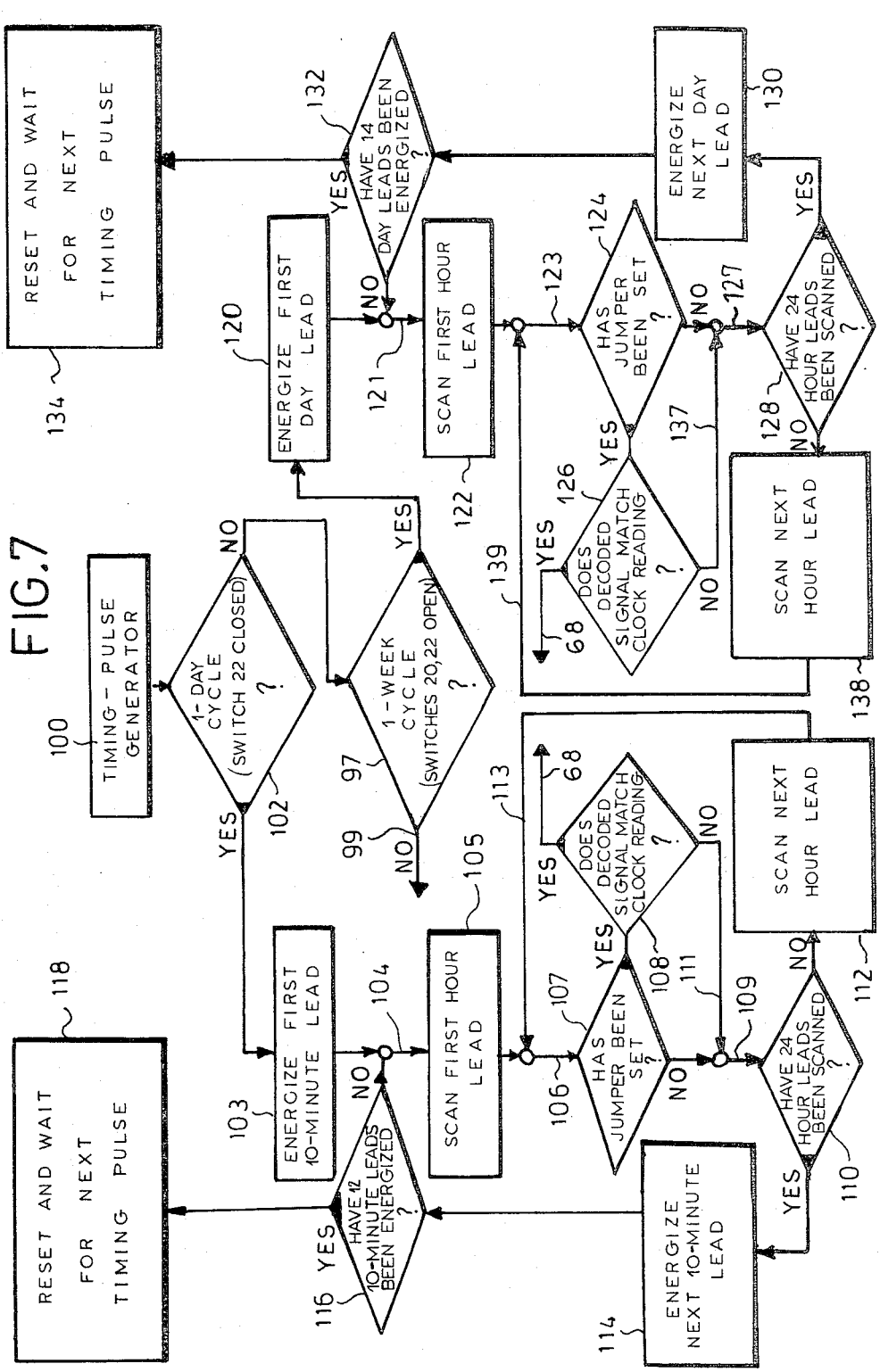

AUTOMATIC CONTROL SYSTEM INCLUDING A PROGRAMMABLE MEMORY WITH MANUALLY INSERTABLE JUMPERS

FIELD OF THE INVENTION

My present invention relates to an automatic control system including a programmable memory of the read-only type to be used for commanding certain switching operations, e.g. changes in the setting of a thermostat of a heating or cooling plant, at preselected times in a program cycle of optionally alterable duration.

BACKGROUND OF THE INVENTION

In schools, offices, theaters and other public buildings as well as residential quarters it is often desirable to provide means for automatically controlling the temperature in a predetermined manner, generally by changing the setting of a thermostat, in order to insure a comfortable level during hours of use and to minimize the expenditure of energy at other times, e.g. at night or on weekends. Seasonal changes, business schedules and other extraneous conditions usually require modifications of the daily on/off periods over cycles of one week or longer.

The use of a manually programmable read-only memory for generating switching commands at selected times of an invariable cycle, e.g. during a 24-hour period, has already been described in commonly owned U.S. Pat. No. 4,164,665 in the name of Hans Berger. According to the teachings of that patent, primary and secondary conductors on a printed-circuit board can be selectively interconnected by jumpers inserted through slits in an overlying cover plate. A scanning circuit operating in real time successively energizes different combinations of primary and secondary conductors to generate an output signal whenever the energized conductors are interconnected by a jumper. This output signal serves as a switching command for the control of a load such as the thermostat of a heating plant.

For modifying the duration of the program cycle of a read-only memory operating in real time, the only known system of which I am aware is the one described in German utility model No. 7,824,156 of Aug. 9, 1978 which uses a rotating program carrier whose speed of rotation can be changed, e.g. from one revolution per day to one revolution per week, with the aid of a gear shifter.

OBJECTS OF THE INVENTION

The general object of my present invention is to provide simple means for changing the duration of a program cycle and/or its subdivisions in a timer-operated control system using a manually programmable read-only memory.

A more specific object is to provide improved means for utilizing, in such a control system, a programmable memory of the type disclosed in the above-identified Berger patent.

SUMMARY OF THE INVENTION

In accordance with my present invention, a multiplicity of primary and secondary conductors in a programmable memory can be electrically bridged by manually settable connector means to form any of a multiplicity of junctions therebetween, each junction identifying the beginning of a respective time interval into which a program cycle is divided. A preferably crystal-controlled real-time clock provides digital readings of these time intervals, the shortest of which substantially exceeds the length of a recurrent operating period of circuitry timed for sequentially energizing the primary conductors and scanning the secondary conductors in order to generate an output signal whenever a scanned secondary conductor is found to be connected to an energized primary conductor. A decoder, forming part of an evaluator also including the aforesaid circuitry, detects the identity of the time interval assigned to the junction giving rise to such an output signal, the evaluator emitting a switching command when that identity matches the current reading of the real-time clock. The duration of these time intervals, and of the overall program cycle, can be varied with the aid of changeover means connected to the evaluator for selectively modifying the operation of the decoder to alter the temporal significance of output signals obtained from the set conductor junctions.

According to a more particular feature of my invention, the primary and secondary conductors form two intersecting arrays which are overlain by a cover plate having a multiplicity of first apertures registering with respective intersections thereof. One or more switches on the cover plate, forming part of the aforementioned changeover means, coact with a program plate which is positionable on the cover plate and has a multiplicity of second apertures registering with at least some of the first apertures of the cover plate upon emplacement, the connector means including jumpers which are insertable into aligned first and second apertures of the two plates.

There are various ways known per se in which such a jumper may bridge a pair of conductors normally insulated from each other. Thus, for example, the two conductor arrays may be carried in the form of an orthogonal matrix on opposite surfaces of a printed-circuit board having throughgoing bores at their intersections, in line with the apertures of the overlying cover plate, so that a conductive post inserted through the cover plate into such a bore will contact both intersecting conductors. In the preferred embodiment described hereinafter, however, I use two-pronged contact members of the type disclosed in the above-identified Berger patent which slide into contact with respective leads on opposite sides of a nonconductive carrier strip perpendicular to the cover plate; the apertures of that cover plate, and of any associated program plate, will then be the aforementioned slits giving passage to the two prongs until the connector head comes to rest on the plate surface. In an advantageous refinement of this arrangement, the conductors of one array may be divided into two sets disposed at different distances from the cover plate; with suitable choice of the length of the prongs and the thickness of a program plate, a given jumper can then be inserted in the absence of that program plate to a depth sufficient to contact a conductor of the more remote set but will only reach a conductor of the closer set when the program plate is in place. In this way, different cycles can be implemented with the cover plate either exposed or overlain by a program plate. Furthermore, as more fully described hereinafter, a program plate may be made reversible so as to establish one cycle in an obverse position and another cycle in a reverse position.

BRIEF DESCRIPTION OF THE DRAWING

The above and other features of my present invention will now be described in detail with reference to the accompanying drawing in which:

FIGS. 3 and 4 are views similar to FIG. 2, illustrating other program plates;

FIG. 7 is a flow chart for two alternative cycles respectively implemented with the program plates of FIGS. 2 and 3;

SPECIFIC DESCRIPTION

Figure 1:
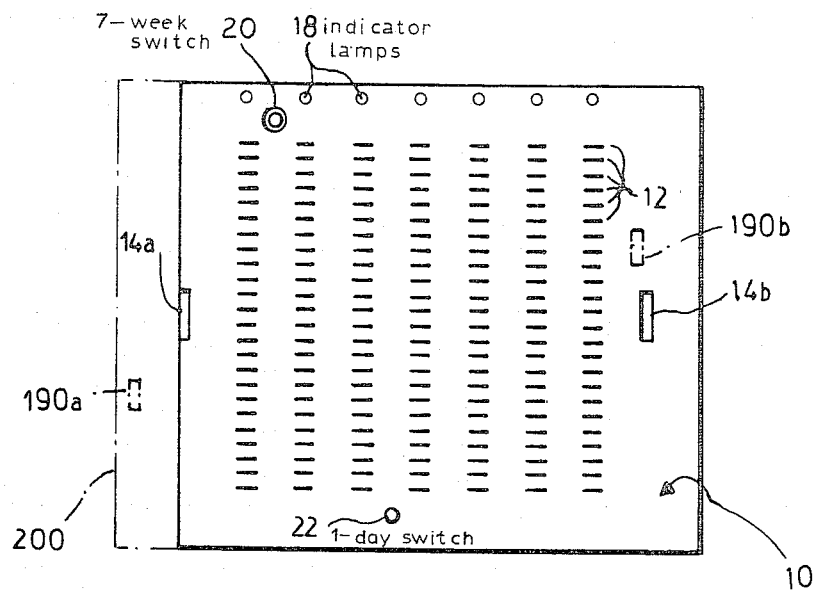
FIG. 1 is a face view of a cover plate for a programmable memory used in a control system according to my invention.
Figure 5:
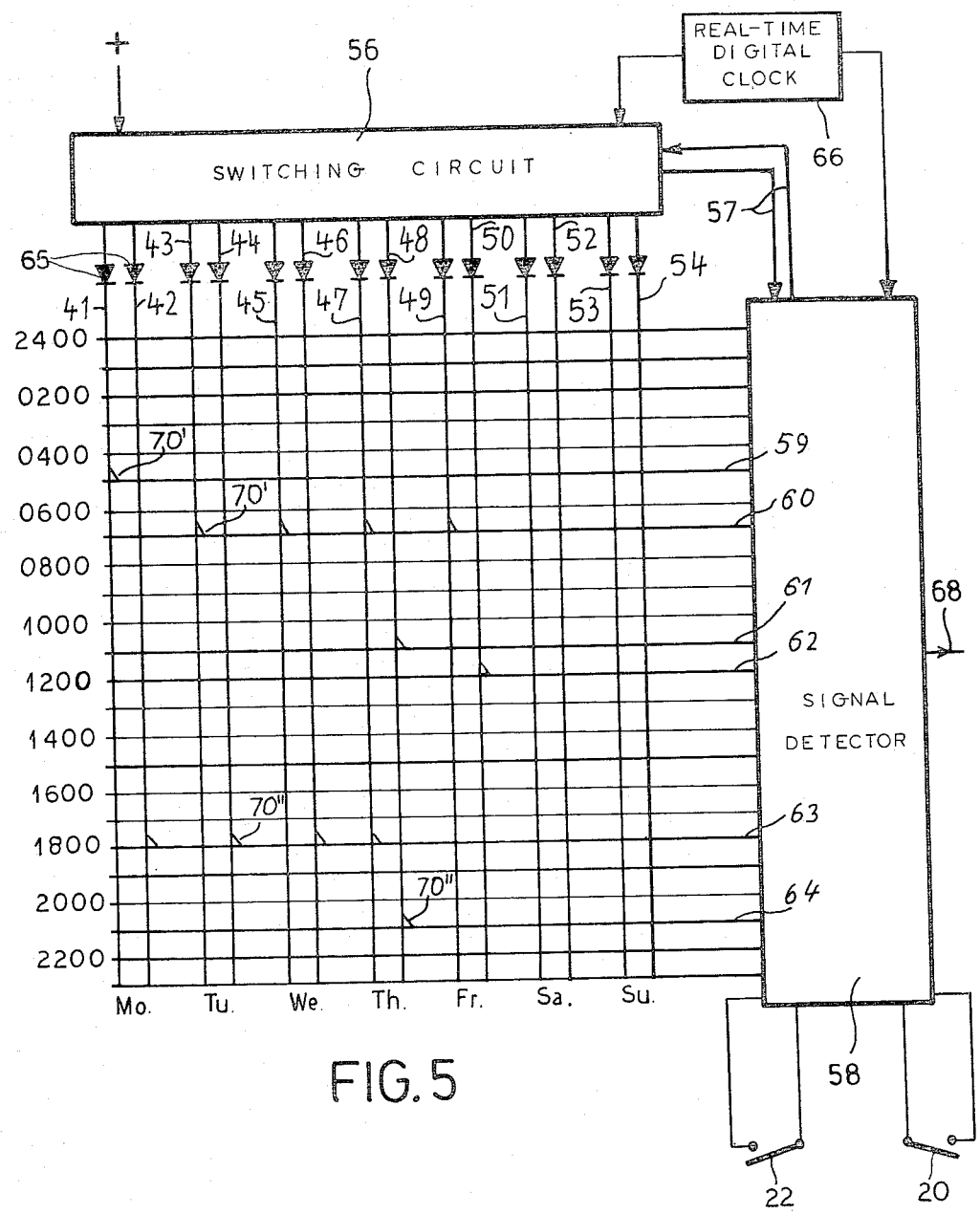
FIG. 5 is a circuit diagram of a conductor matrix forming part of the programmable memory.

In FIG. 1 I have shown a dielectric cover plate 10 of an otherwise nonillustrated frame containing two sets of conductors arrayed in an orthogonal matrix as seen in FIG. 5. Plate 10 is formed with a multiplicity of slits 12 arrayed in seven columns, each column overlying a respective pair of primary conductors illustrated at 41–54 in FIG. 5. Secondary conductors orthogonally intersecting these primary conductors, some of which have been designated 59–64 in FIG. 5, register each with a respective slit 12 in each column; there are 24 slits per column in the embodiment here described. The slits can be penetrated by manually insertable jumpers of the sliding-contact type, two of which have been shown at 70' (with red head) and 70" (with blue head) in FIGS. 11 and 12, to interconnect two intersecting conductors at a junction registering with a selected slit; their distinctively colored heads may be formed from injection-molded resinous material. Jumpers 70' and 70" are of different length but otherwise interchangeable and, upon insertion, will form a short circuit between one of the secondary conductors and one or the other of the two primary conductors intersecting same below the slit, again as diagrammatically illustrated in FIG. 5. Thus, a jumper 70' may connect the left-hand lead such as conductor 41 of any primary pair to a selected secondary lead such as conductor 59 whereas a jumper 70" may connect the right-hand lead of a primary pair, such as conductor 44, to a secondary lead such as conductor 63.

Figure 2:
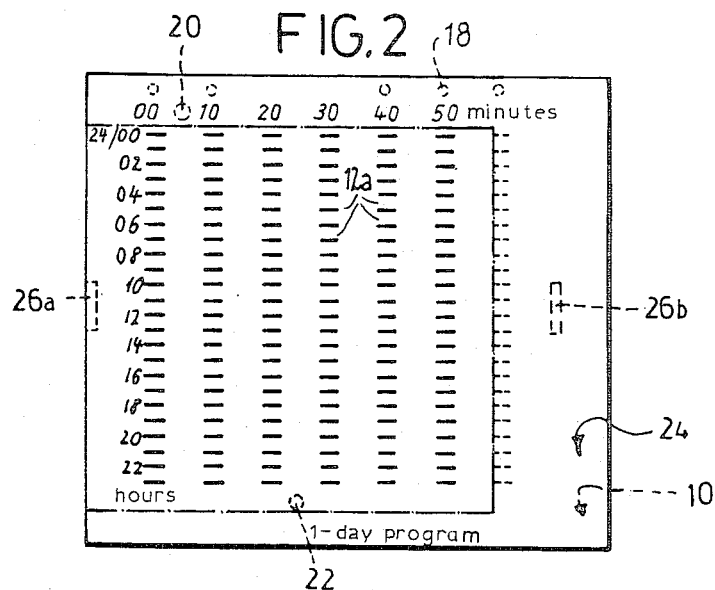
FIG. 2 is a face view of a program plate overlying the cover plate of FIG. 1.

Cover plate 10 of FIG. 1 is further provided with rectangular cutouts 14a, 14b serving as locators for a superposed program plate such as one of those shown at 24, 24 and 38 in FIGS. 2, 3 and 4. A row of indicator lamps 18, recessed within cover plate 10, are obstructed by an overlying program plate 24 but are visible through openings 36 in program plates 34 and 38 when one of these latter plates is mounted on the memory frame. It will be apparent that similar indicators could also be used to discriminate between plates 34 and 38 in order to alert the user to the nature of the program in progress; it is also possible to provide switches closable by tabs or the like on the program plates to energize respective signal lamps. The several program plates are further provided, on their reverse sides, with projecting locator ribs 26a, 26b closely fitting into cutouts 14a, 14b of cover plate 10 to insure a correct positioning. Two switches 20 and 22 on plate 10 serve for the establishment of either a 1-day cycle or a 7-week cycle, depending on which program plate is being used. The 7-week switch 20 is in the form of a recessed pushbutton whereas the 1-day switch 22 is a pushbutton projecting from plate 10. Program plate 24 has a solid portion overlying pushbutton 22 which is therefore depressed to close the 1-day switch when that plate is emplaced whereas switch 20 remains unoperated in this case. On the other hand, plates 34 and 38 have holes 40 registering with pushbutton 22 to leave the 1-day switch unoperated, plate 38 being further provided on its reverse side with a projection 30 depressing the recessed pushbutton 20 upon its emplacement so as to close the 7-week switch. When both switches are unoperated, as with the use of program plate 34, the system is set for a 1-week program cycle. In the absence of anciliary retaining means, the frictional engagement of ribs 26a, 26b in their respective cutouts 14a, 14b must of course be sufficiently strong to resist the restoring spring force acting upon any depressed pushbutton and to prevent changes in switch position also during the extraction and reinsertion of a jumper.

Plates 24, 34 and 38 are provided with respective slits 12a, 12b and 12c positioned to register with some or all of slits 12 in cover plate 10. Thus, program plate 24 has only six columns of 24 slits 12a each, its emplacement on plate 10 of FIG. 1 obstructing the extreme right-hand column of slits 12. Plate 34 has as many slits 12b as there are slits 12 in plate 10; thus, none of the latter slits is blocked when this plate is in place. Plate 38 has seven columns, each with 21 slits 12c, whereby the last three slits 12 of each column of cover plate 10 are made inaccessible.

The six columns of slits 12a of 1-day plate 24 (FIG. 2) are labeled in 10-minute intervals from 00 through 50 minutes. The slits of each column represent 1-hour periods, alternate rows of these slits being therefore designated 24/00, 02, 04 etc. through 22 to indicate times from 24 hours (midnight) through 23 hours (11 p.m.). Thus, the sixth slit of the fourth column represents the time of 0530 hours (5:30 a.m.) whereas the 19th slit of the second column represents the time of 1810 hours (6:10 p.m.).

The seven columns of 1-week plate 34 (FIG. 3) represent the seven days of the week and are thus respectively labeled Mo, Tu, We, Th, Fr, Sa and Su. The 24 rows of slits again represent the hours from 24/00 through 23.

The columns of slits on plate 38 (FIG. 4) are labeled for seven consecutive weeks. Its 21 rows of slits are divided into seven groups of three slits each, each group being assigned to a respective day of the week from Monday through Sunday; the three rows of each group represent the beginning of respective 8-hour intervals within a 24-hour period, e.g. 2400, 0800 and 1600 hours. It is convenient to make all these intervals identical with one another, though that is not absolutely necessary. In this specific instance, the fifth slit of the fourth column of slits 12c in FIG. 4 represents 0800 hours on Tuesday of the fourth week whereas the last slit of the first column represents 1600 hours of the first Sunday of a 7-week cycle. Corresponding positioned slits 12b in FIG. 3 would signify 0400 hours of any Thursday and 2300 hours of any Monday, respectively.

In FIG. 1 I have indicated in phantom lines, at 200, the possibility of extending cover plate 10 to the left in order to provide a supporting surface for the program plate 34 or FIG. 3 in an inverted position in which two projecting ribs 191a, 191b on the obverse surface of plate 34, also shown in phantom lines, would be received in respective cutouts 190a, 190b similarly shown in FIG. 1. In this alternate position, plate 34 has been rotated about its horizontal centerline and shifted to the left with reference to the position of FIG. 3 so that its left-hand column of slits 12b would no longer be aligned with any slits 12 of plate 10 whereas the right-hand column of slits 12 would be overlain by a solid portion of plate 34. Since the hole 40 of plate 34 would then no longer register with switch 22, the inverted plate 34 would operate in the same manner as the plate 24 of FIG. 2 to establish a 1-day cycle. For this purpose the rear surface of plate 34 may be provided with legends corresponding to those of plate 24.

Figure 6:
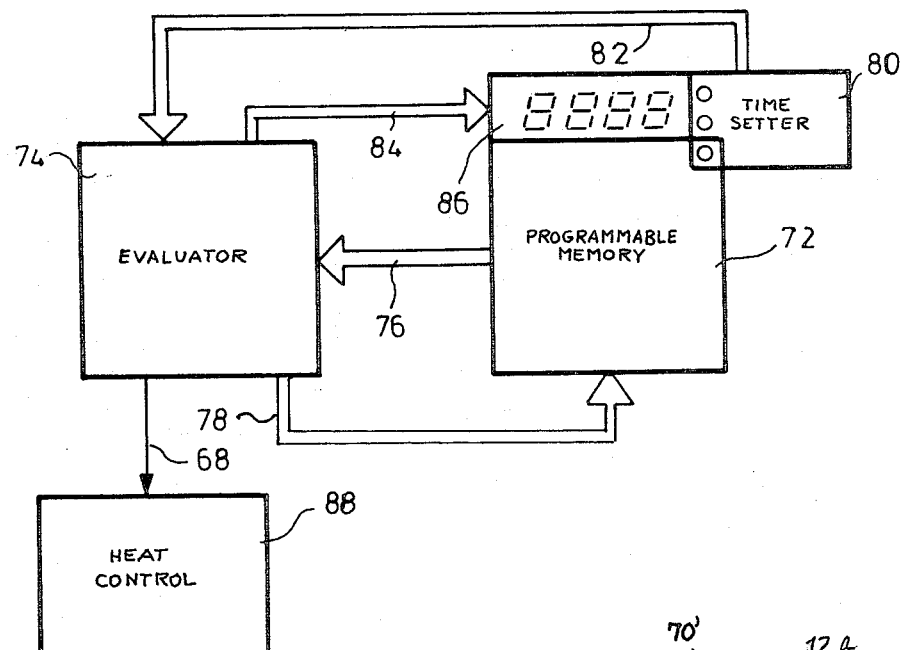
FIG. 6 is a block diagram of the control system including that memory.

Reference will now be made to FIGS. 5–7 for a detailed description of the mode of operation of the control system according to my invention. In FIG. 5 I have shown a real-time digital clock 66 controlling a switching circuit 56 on the one hand and a signal detector 58, acting as a scanner and decoder, on the other hand. Clock 66 establishes a short operating period, preferably of one minute, for switching circuit 56 and also supplies digital readings of current time intervals to detector 58. These time intervals, manually settable by a selector 80 shown in FIG. 6, will be ten minutes for the 1-day cycle of program plate 24 (FIG. 2), one hour for the 1-week cycle of program plate 34 (FIG. 3) and eight hours for the 7-week cycle of program plate 38 (FIG. 4).

In the course of its operating period, switching circuit 56 consecutively energizes the vertical conductors 41–54, via respective diodes 65, if the seven conductor pairs are all utilized as they are in the 1-week program or the 7-week program of FIG. 3 or FIG. 4. With a program requiring only six of these conductor pairs, such as that of FIG. 2, the last two conductors 53 and 54 remain inactive. In the specific instance depicted in FIG. 5, which relates to the 1-week program established by the plate 34 of FIG. 3, the 24 horizontal conductors represent the hours from midnight through 2300 (11 p.m.). From FIG. 11 it will be noted that the two leads of a vertical conductor pair of FIG. 5, such as "day" leads 41 and 42, extend longitudinally one above the other on one major surface of a printed-circuit strip 40 while the "hour" leads labeled 2400, 0100, 0200, 0300 etc. rise transversely on the opposite surface of the strip.

The "hour" leads on strip 40, aligned with respective slits 12b of program plate 34, are directly connected to homologous leads on other strips parallel thereto, underlying the remaining columns of slits, to form the throughgoing horizontal conductors of FIG. 5.

A "red" jumper 70' inserted through a slit 12b of plate 34 (and through the underlying slit of plate 10 omitted in FIG. 11 for the sake of clarity) has short prongs 70a' and 70b', the latter contacting one of the "hour" leads while the former can reach only the upper "day" lead 41. A "blue" jumper 70'' has long prongs 70a'' and 70b'' interconnecting, upon insertion, another "hour" lead and the lower "day" lead 42. The red-headed jumpers 70' are assumed to serve for turning a thermostat up while the blue-headed jumpers 70'' are designed to turn it down.

In the energized state of any vertical conductor of FIG. 5, switching circuit 56 controls the signal detector 58 via a two-way connection 57 to scan the entire array of horizontal leads (with the exception of the last three in the case of the 7-week program of FIG. 4) at a rapid rate. Whenever a jumper 70' or 70'' interconnects an energized vertical lead and a scanned horizontal lead, detector 58 converts the resulting output signal into a temporal value denoting the start of a respective time interval, i.e. a full hour on the corresponding day of the week in the 7-day program here considered. If the digital representation of this time matches the current reading of clock 66, circuit 58 emits a switching command on an output line 68. The operation of the decoder of circuit 58, i.e. its mode of conversion of a given output signal into a digitized temporal indication, can be modified by the switches 20 and 22 shown connected to that circuit in FIG. 5. The decoder may comprise three or possibly more data stores assigned to respective programs, the store chosen by switches 20 and 22 being addressable by gating circuits responsive to combinations of reference signals from switching circuit 58 (identifying the currently energized "day" leads 41–54) and output signals from the several "hour" leads to read out the corresponding interval designation.

With jumpers 70' and 70'' set as shown in FIG. 5, the temperature-raising times written in the memory are Monday at 0500 hours (junction of leads 41 and 59), Tuesday through Friday at 0700 hours (junctions of leads 43, 45, 47, 49 with lead 60), and once again Thursday night at 1800 hours (junction of leads 47 and 63); the corresponding temperature-lowering times are Monday through Wednesday at 1800 hours (junctions of leads 42, 44, 46 with lead 63), Thursday at 1100 and 2000 hours (junctions of lead 48 with leads 61 and 64), and Friday at 1200 hours (junction of leads 50 and 62). At the beginning of each week, therefore, a first heat-up command will be emitted by circuit 58 on line 68 as soon as lead 59 is scanned while clock 66 reads the fifth hour of the first day; before the weekend, a last cool-down command will be generated upon the scanning of lead 62 while the clock reads out the noon hour of the fifth day. No temperature-changing commands will be sent out on Saturday and Sunday. Without modifying the program cycle, these times can be varied by repositioning the corresponding jumpers 70', 70''.

FIG. 6 shows the programmable memory as a block 72 dialoguing with an evaluator 74, which includes circuits 56, 58 and clock 66 of FIG. 5, via data lines 76 and 78. A connection 82 enables the selector 80 to set the clock in evaluator 74, i.e. to let it read out real-time intervals as required for the selected program, namely 10-minute intervals for a full day in the cycle of FIG. 2, one-hour intervals for a full week in the cycle of FIG. 3, and eight-hour intervals for seven consecutive weeks in the cycle of FIG. 4. The clock readings can be visually monitored on a digital display 86 stepped via a connection 84. Line 68 extends to a heat-control unit 88.

The logical circuitry of evaluator 74 periodically performs, e.g. once every minute as assumed above, a microprogram as represented by the flow diagram of FIG. 7. The microprogram starts with the emission of a timing pulse from a generator 100 which could be a 1-minute output of clock 66 (FIG. 5). Pulse generator 100 triggers a decision stage 102 which checks whether or not the 1-day cycle has been selected, i.e. whether the switch 22 has been closed by the program plate 24 of FIG. 2. The YES output of stage 102 gives rise to an instruction ENERGIZE FIRST 10-MINUTE LEAD represented by a block 103, thus resulting in the application of positive voltage to conductor 41 of FIG. 5 which in this instance is aligned with the 00-minute column of plate 24. There follows, via a link 104, a step SCAN FIRST HOUR LEAD, represented by a block 105, which instructs the detector 58 to ground in succession all the horizontal conductors of FIG. 5 via respective load resistors not shown. A link 106 extends from block 105 to a decision stage 107 which inquires whether a jumper has been set in contact with the energized 10-minute lead, thus producing a measurable voltage drop across one of the load resistors in circuit 58. If such is the case, another decision stage 108 linked with the YES output of stage 107 determines whether the output signal constituted by that voltage drop and an accompanying reference signal from circuit 56, decoded as described above, matches the real-time reading of clock 66. The YES output of stage 108 is linked to the line 68 emitting a switching command of the temperature-raising type.

The NO output 109 of stage 107 is joined to the NO output 111 of stage 108 so that a negative outcome of either inquiry brings on a further decision stage 110 determining whether all 24 hour leads have been scanned. If the answer is NO, a step 112 with instruction SCAN NEXT HOUR LEAD returns the microprogram via a link 113 to the input 106 of stage 107. If no switching command is generated on line 68 until all 24 hour leads have been scanned, an instruction ENERGIZE NEXT 10-MINUTE LEAD appears in a step 114 which gives rise to an inquiry in a stage 116 whether all 12 conductors 41–52 involved in the program have been energized. Since the lead now energized is assumed to be conductor 42, the answer is NO and the scanning loop 105–113 is re-entered by way of link 104. If this gives rise to an output signal matching the clock reading, a switching command of the temperature-lowering type appears on line 68.

The exploration of all the conductors of the matrix, taking a small fraction of the one-minute period of pulse generator 100, is terminated in the absence of a detected output signal upon an affirmative answer at decision stage 116 which aborts the switchover to another vertical conductor in FIG. 5 and produces an instruction RESET AND WAIT FOR NEXT TIMING PULSE in a final step 118.

If the answer to the inquiry in step 102 is negative, i.e. if a 1-day cycle has not been programmed, the evaluator passes to another decision stage 97 inquiring whether a 1-week cycle according to FIG. 3 has been established by the opening of both switches 20 and 22. If the answer is YES, an instruction ENERGIZE THE FIRST DAY LEAD is generated in a step 120 which is analogous to step 103 and has the same result, namely the application of voltage to conductor 41 in FIG. 5 underlying in this instance the "Monday" column of slits 12b on plate 34. Instructions 122, 130, 138 and inquiries 124, 126, 128 are identical with instructions 105, 114, 112 and inquiries 107, 108 and 110, respectively, and are reached via links 121, 123, 127, 137 and 139. Thus, an affirmative reply to inquiry 126 results again in the emission of a switching command over line 68, the nature of this command depending on whether an odd-numbered or an even-numbered conductor 41–54 is being concurrently energized. A decision stage 132 in the scanning loop 122–130 poses the question HAVE 14 DAY LEADS BEEN ENERGIZED? and, after a fourteenth traverse of the loop, establishes a waiting period in a step 134 identical with step 118.

If decision stage 97 also has a negative outcome, the evaluator passes via a NO output 99 of that stage to another microprogram which is analogous to the one last described except that each horizontal lead now represents an 8-hour interval and the scan of these leads is terminated, in the absence of an output signal, after 21 passes through the counterpart of decision stage 128. This is brought about by the closure of switch 20 to the exclusion of switch 22 with the aid of program plate 38 to establish the 7-week cycle in accordance with FIG. 4.

Figure 13:
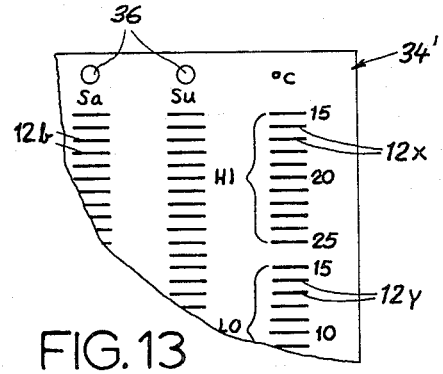
FIG. 13 is a fragmentary face view of another program plate similar to that of FIG. 3.

The thermostat settings brought about by the temperature-raising and temperature-lowering commands transmitted to heat-control unit 88 of FIG. 6 by way of line 68 can be selected, pursuant to another feature of my invention, by providing at least the cover plate 10 and preferably also the overlying program plate with another set of slits for the selective energization of underlying address leads by an inserted jumper. This has been illustrated in FIG. 13 where a modified program plate 34' has an additional column of slits 12x, 12y giving high-level and low-level readings, respectively. With a red-headed jumper in one of the slits 12x and a blue-headed jumper in one of the slits 12y, the respective address leads read out the switching commands on line 68 in the form of binary words specifying the selected levels.

Figure 11:
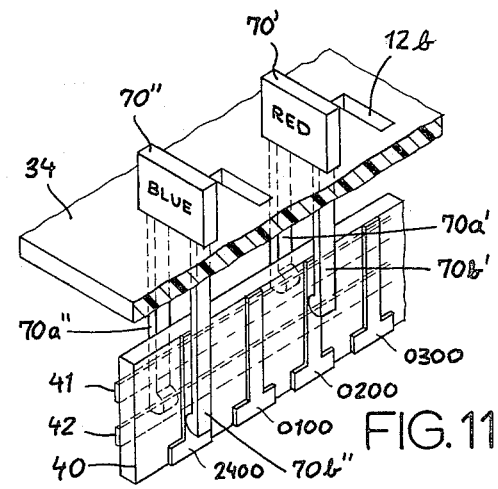
FIG. 11 is a fragmentary perspective view of the physical structure of a memory similar to that of U.S. Pat. No. 4,164,665, with its cover plate omitted but with part of a program plate shown.

With the memory structure illustrated in FIG. 11, the insertion of jumpers 70', 70" into slits 12 of cover plate 10 will be ineffectual in the absence of an overlying program plate since the tips of their prongs 70a', 70a" will then come to lie between or below conductors such as those shown at 41, 42. It is, however, possible to rearrange these conductors in such a manner that jumpers inserted into the exposed cover plate, with no program plate interposed, reach a different set of conductors so as to establish a further program cycle. This has been shown in FIG. 12 where a program plate 39 has slits 12d penetrated by jumpers 70', 70" also passing through aligned slits 12 of an underlying cover plate 10' overlying carrier strips 40 with transverse conductors 59', 59" (interconnected as explained above to form part of the lead 59 of FIG. 5) and two sets of longitudinal conductors 41–44 and 41'–44'. In the presence of program plate 39, prongs 70a' and 70a" contact conductors 44 and 41 of the set shown in FIG. 5; with plate 39 removed, these prongs would respectively engage conductors 44' and 41' of the alternate set which are more remote than the former from cover plate 10'.

Figure 8:
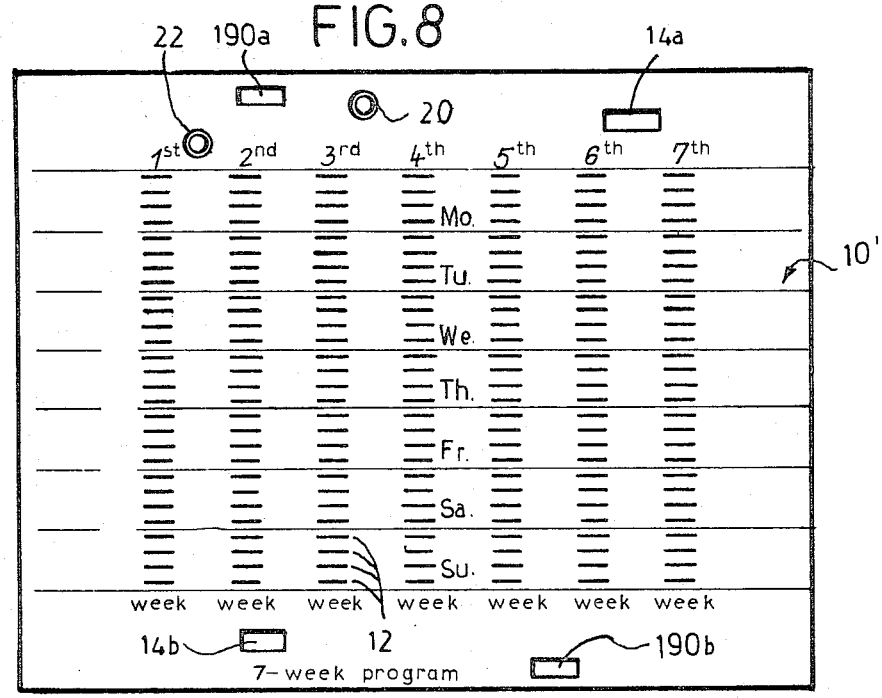
FIG. 8 is a face view of a modified cover plate generally similar to that of FIG. 1.

Plate 10', fully represented in FIG. 8, has seven columns of 28 slits 12 each; there are also the switches 20 and 22, both recessed in this instance, as well as cutouts 14a, 14b and 190a, 190b at locations different from those of plate 10 in FIG. 1. The slits 12 of plate 10' are arrayed according to a 7-week program differing from that of FIG. 4 by providing for four 6-hour intervals per day in lieu of the 8-hour intervals described above. Thus, the columns are again labeled for seven consecutive weeks while each column is divided into seven groups of four slits each, these groups being assigned to respective days of the week.

Figure 9:
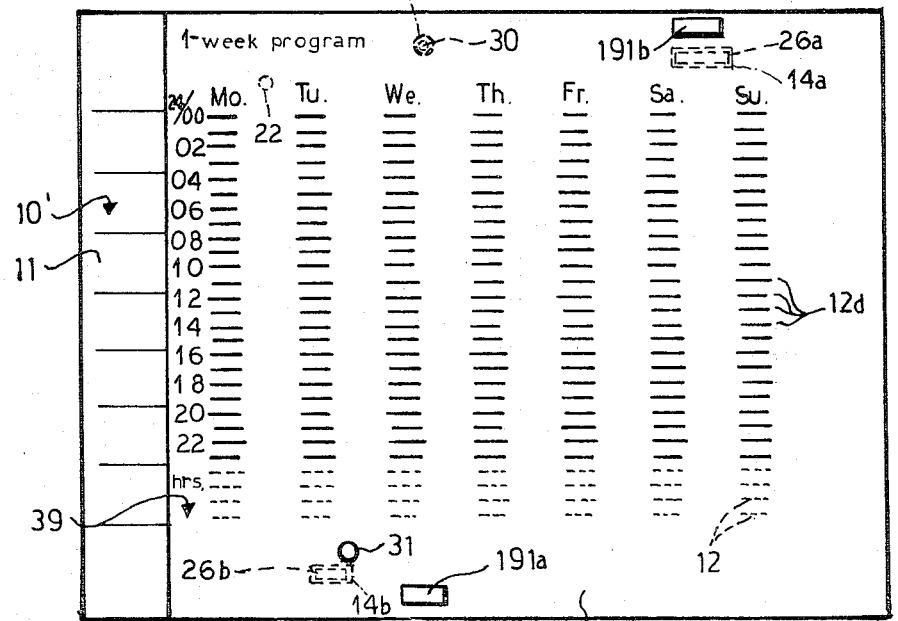
FIGS. 9 and 10 are respective views of the obverse and the reverse side of a reversible program plate overlying the cover plate of FIG. 8.
Figure 10:
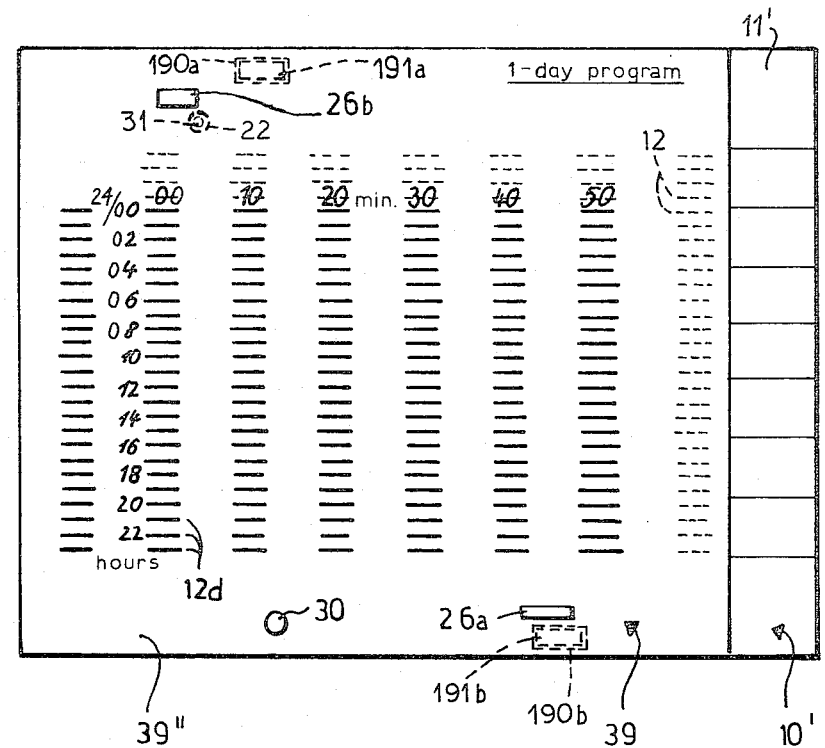

Program plate 39 has an obverse side 39', seen in FIG. 9, and a reverse side 39", seen in FIG. 10. Each of its seven columns has only 24 slits 12d which in the position of FIG. 9 register with as many slits 12 of plate 10', leaving the four lowermost slits 12 of each column unused and obstructed. In this position, with a marginal left-hand zone 11 of plate 10' remaining exposed, locator ribs 26a, 26b on the reverse side of plate 39 engage in cutouts 14a, 14b while a projection 30 on the same side depresses the countersunk pushbutton 20 to establish the one-week program by closure of that switch; in contrast to the arrangement described with reference to FIGS. 3 and 7, switch 22 remains unoperated in this instance. The operation otherwise conforms to the right-hand half of the flow chart of FIG. 7.

Figure 12:
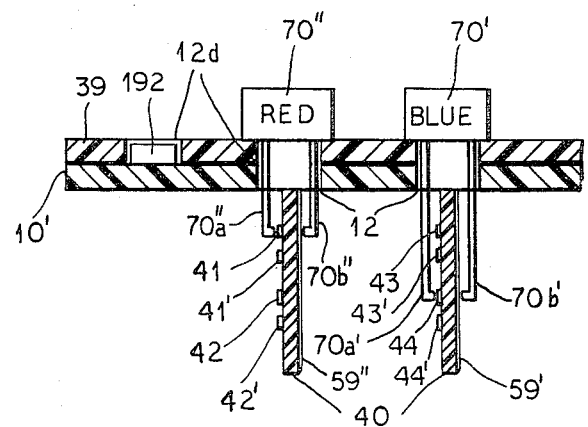
FIG. 12 is a fragmentary cross-sectional view of a slightly modified memory structure, showing both the cover plate and an overlying program plate.

In the inverted position of plate 39 shown in FIG. 10, that plate not only has been flipped about its horizontal centerline but has also been shifted to the left with reference to FIG. 9, thereby exposing a right-hand marginal zone 11' of plate 10'. The rightmost column of slits 12 of plate 10' is blocked, as are the four uppermost slits of each other column. The leftmost column of slits 12d of plate 39 overlie the solid portion 11 of plate 10' and are therefore unusable. As shown in FIG. 12, plate 10' may be provided on that zone with upstanding ribs 192 (omitted in FIGS. 8 and 9) occupying these superfluous slits 12d for preventing any inadvertent attempts to insert a jumper. The six active columns of slits 12d are marked on the reverse side 39" by the same 10-minute intervals that characterize the 1-day program of plate 24 in FIG. 2; the 24 slits of each column bear the designations of a 24-hour clock. With locator ribs 191a, 191b on the obverse side received in cutouts 190a, 190b of plate 10', and with a projection 31 on the same side depressing the pushbutton 22 while switch 20 remains open, the operation conforms to the left-hand half of the flow chart of FIG. 7.

With program plate 39 removed, cover plate 10' can be used to establish the aforementioned 7-week program of four 6-hour intervals per day. Switching circuit 56 of FIG. 5 then energizes conductors 41' etc. (FIG. 12) in lieu of vertical conductors 41-54 while detector 58 scans 28 horizontal leads in lieu of the 24 "hour" leads shown in FIG. 5. Switches 20 and 22 are both unoperated in this instance. The roles of the columns and rows in FIG. 4 or FIG. 8 could be interchanged, if desired. The four additional horizontal leads used in this cycle may lie in areas of strips 40 beyond conductors 41–54 so as to intersect only the alternate set 41' etc.

It will be apparent that the system according to my invention can be further modified to accommodate a variety of other program cycles (e.g. for four weeks or one month) and that connectors other than the jumpers 70', 70" may be used for selecting the instants when switching commands are to be emitted. When the level difference described with reference to FIG. 12 is not required for the purpose of discrimination, the slits of the program plate or plates could be extended to accommodate the heads of the jumpers which will then always come to rest on the cover plate itself to establish the selected connections.

While my invention has been found particularly practical for temperature control in heating or air-conditioning systems, the switching commands emitted at preselected times of a recurrent cycle can evidently also be used for other purposes.

I claim:

1. A programmable system for the automatic control of switching operations at preselected times in a program cycle divided into a multiplicity of time intervals of changeable duration, comprising:

memory means including a multiplicity of primary and secondary conductors forming two intersecting arrays;

manually settable connector means for electrically bridging a selected primary conductor and a selected secondary conductor to form any of a multiplicity of potential junctions each identifying the beginning of a respective time interval;

clock means providing real-time digital readings of said time intervals;

evaluating means including circuitry timed for sequentially energizing said primary conductors and scanning said secondary conductors in a recurrent operating period substantially shorter than the shortest of said time intervals with generation of an output signal upon the scanning of any secondary conductor connected to an energized primary conductor, said evaluating means further including decoding means for detecting the identity of the time interval assigned to the junction giving rise to said output signal and for emitting a switching command upon said identity matching the current reading of said clock means; and changeover means connected to said evaluating means for selectively modifying the operation of said decoding means to alter the temporal significance of output signals obtained from said junctions;

said memory means further including a cover plate overlying said arrays and having a multiplicity of first apertures registering with respective intersections of said arrays, said changeover means including switch means on said cover plate and at least one program plate positionable on said cover plate to coact with said switch means, said program plate being provided with a multiplicity of second apertures registering with at least some of said first apertures upon emplacement of said program plate on said cover plate, said connector means including jumpers insertable into aligned first and second apertures.

2. A system as defined in claim 1 wherein said program plate is alternatively positionable on said cover plate in an obverse position and in a reverse position with obstruction of certain of said first apertures in at least one position thereof and with different effects upon said switch means in said obverse and reverse positions.

3. A system as defined in claim 1 or 2 wherein said cover plate and said program plate are provided with mating formations for the precise alignment of respective apertures thereof.

4. A system as defined in claim 1 or 2 wherein said cover plate is provided with indicator means visible through at least one opening of said program plate upon correct positioning of the latter on the former.

5. A system as defined in claim 1 or 2 wherein the conductors of one of said arrays are divided into two sets disposed at different distances from said cover plate, said jumpers being insertable into said first apertures in the absence of said program plate to a depth sufficient to contact the conductors of the more remote one of said sets but being engageable only with the conductors of the closer one of said sets upon passing through aligned first and second apertures of said cover and program plates.

6. A system as defined in claim 1 or 2 wherein said switching operations modify the setting of a thermostat, at least said cover plate being provided with additional apertures overlying intersections of other conductors interconnectable by an inserted jumper for selecting a thermostat setting to be established by said switching command.

* * * * *